W. F. FOLMER.
PHOTOGRAPHIC SHUTTER.
APPLICATION FILED NOV. 23, 1912.

1,060,331.

Patented Apr. 29, 1913.

2 SHEETS—SHEET 1.

Inventor
William F. Folmer

Witnesses

By Church & Rich
his Attorneys

W. F. FOLMER.
PHOTOGRAPHIC SHUTTER.
APPLICATION FILED NOV. 23, 1912.
1,060,331.
Patented Apr. 29, 1913.
2 SHEETS—SHEET 2.
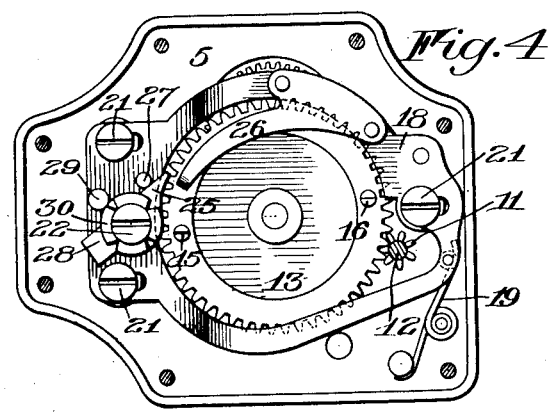
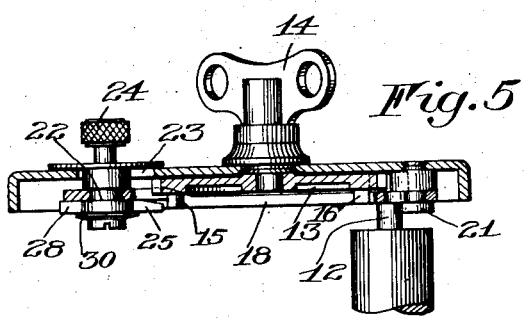
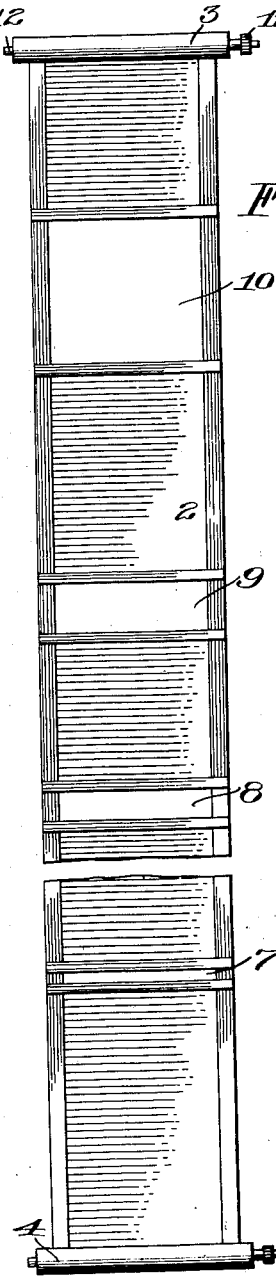
Inventor
William F. Folmer
Witnesses
Walter B. Payne
By
His Attorneys

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,060,331.  Specification of Letters Patent.  Patented Apr. 29, 1913.

Application filed November 23, 1912. Serial No. 733,054.

*To all whom it may concern:*

Be it known that I, WILLIAM F. FOLMER, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters, and it has for its object to provide a simple, convenient controlling mechanism for a curtain shutter whereby its versatility is greatly increased. In one instance of its use it performs the object of making one exposure with a plurality of all of the apertures of a continuous multiple-aperture curtain with an effect that approximates a time exposure of automatically controlled duration.

To these and other ends the invention consists in certain improvements and combinations of parts all as will be hereinafter more fully described, the novel features being pointed out in the claims at the end of the specification.

Figure 1:
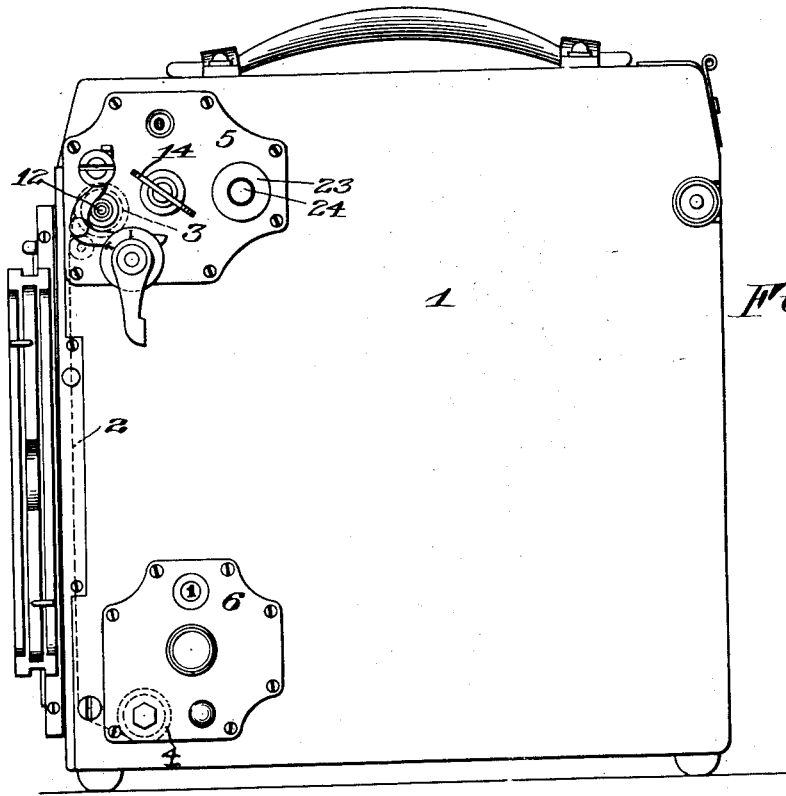
Figure 3:
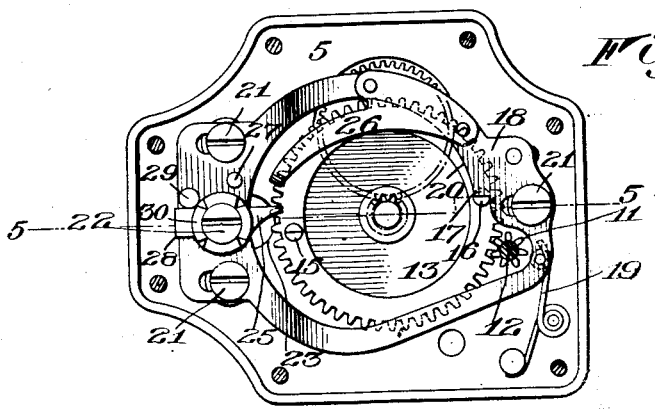

In the drawings: Figure 1 is a side elevation of a camera provided with a curtain shutter mechanism constructed in accordance with and illustrating one embodiment of my invention; Fig. 2 is an elevation of the curtain extended; Fig. 3 is an inside elevation of the shutter controlling mechanism with the parts in position for an instantaneous exposure, or an exposure involving a single aperture; Fig. 4 is a similar view with the parts in position for a continuous exposure involving a plurality of the apertures, and Fig. 5 is a section taken substantially on the line 5—5 of Fig. 3.

Similar reference numerals throughout the several figures indicate the same parts.

In Fig. 1 is shown in a general way a camera 1 provided with a curtain shutter, the position of which is indicated in dotted lines at 2 and the positions of its winding roller and tension roller at 3 and 4, respectively, in the same manner. The controlling mechanisms for the respective rollers are mounted upon plates 5 and 6, as also shown in the same figure. In the present embodiment, the controlling mechanism of my invention is shown in connection with the winding roller, but it will be understood, after the following description, that it is applicable to the tension roller as well, with respect to some of the advantages attained, for the purpose of increasing or diminishing the influence of such roller on the curtain. With the arrangement illustrated, however, it will be understood that any suitable controlling mechanism may be provided for the tension roller 4 which, in itself, may be of any preferred construction.

The practice of my invention as herein shown contemplates the use of a continuous curtain 2 having a plurality of successively arranged exposure apertures 7, 8, 9, 10 of different light capacities, the curtain being wound on the winding roller 3 with a tendency to travel to the tension roll 4 which takes it up. The feed roll 3 carries at one end a gear 11 on its shaft 12 that meshes with and drives a revoluble member 13 journaled in the plate 5 as the curtain is unwound from the winding roll onto the tension roll. This revoluble member 13 may be rotated by an exteriorly arranged key 14 to wind the curtain on the feed roll 3 and to this end the revoluble member is provided, in the present instance, with two abutments 15 and 16 that are adapted to be successively engaged by a winding stop 17 on a yoke-shaped escapement member 18 that normally tends to assume a position bringing the winding stop 17 in the path of the abutments 15 and 16 under the influence of a suitable spring 19.

During the winding movement, the member 13 is rotated to the right in Fig. 3 and that one of the abutment pins 15 and 16 thereon which is approaching the winding stop 17 displaces the escapement member 18 against the tension of the spring 19 by engagement with the cam surface 20 adjacent thereto until the said stop snaps in behind it, the escapement being guided for such reciprocatory vibration upon suitable guide pins 21. An operating member 22 carried by the escapement 18 and projecting through a slot 23 in the cover plate 5 terminates in an operating head 24 forming an exteriorly arranged means for manually actuating the escapement 18 against the tension of the spring 19 and releasing the abutment 15 or 16 that is in engagement with the winding stop 17 thereby actuating the shutter for exposures of all kinds. When so released, the abutment on the member 13 travels a half revolution to the left in Fig. 3 or until it comes against an arresting stop 25 which is carried on the opposite side of the escapement 18 and is normally out of the path of the abutment, but which is moved into such path coincidently with the release of the abutment by the winding stop 17. The member shown at 26 is a spring latch that is displaced by the abutment on the member 13 previously to its engagement with the arresting stop 25 and which prevents a rebound.

The gearing is so proportioned with the structure of the present embodiment of the invention that each half revolution of the member 13 driven by the feed roll 23 will unwind one of the apertures 7, 8, 9, 10 from said feed roll or, at least, send one aperture across the focal plane. Thus, any of the instantaneous exposures for which the various apertures are provided may be made with an actuation of the escapement 18 according to the degree to which the curtain is wound upon the winding roll 3, and if completely wound up all may be made in succession by successively actuating the escapement 18 by means of the operating member 24 and a time exposure of any desired length, dependent, however, upon manual dexterity, may be and is ordinarily, effected by halting the maximum aperture 10 in the focal plane by one actuation of the controlling mechanism and then, the succeeding opaque portion of the curtain by a succeeding actuation. In order, however, that it may be possible to cause all or a plurality of the apertures to successively flash across the focal plane with a speed commensurate with the degree of tension of the take-up roll 4 upon one actuation of the escapement 18, I make the arresting stop 25 capable of individual actuation on the escapement, independently of the winding stop 17, to an inoperative position relatively to the abutments 15 and 16 on the rotatable member 13 regardless of the position of the escapement, such position of the arresting stop being shown in Fig. 4. With this adjustment, the reciprocation of the escapement 18 that releases the winding stop 17 from either of the abutments 15 and 16 fails to correspondingly actuate the arresting stop 25 into their path and the result is that the whole curtain is allowed to run from the winding roll 3 onto the take-up roll 4 provided the escapement is retained in the extreme position. Thus, a longer exposure is permitted than would ordinarily be effected by automatic means, yet its duration may be accurately and uniformly controlled, a low tension on the take-up roll 4 making the progress of the successive apertures across the field very slow indeed.

I prefer to affix the arresting stop 25 upon the operating stud or member 22 and to journal the latter rotatably in the escapement 18 so that its rotation through the medium of the knob 24 actuates the arresting stop individually and independently while its reciprocation causes the reciprocation of the escapement and the joint actuation of both of the stops 17 and 25 thereon. With this arrangement, the inoperative position of the arresting stop 25 may be defined by its engagement with an abutment 27 and its operative position by the engagement of an extension 28 thereof with an abutment 29. 30 represents a spring washer that provides against an inadvertent movement of the arresting stop due to the jars incident to the operation of the mechanism.

Another advantage of the construction is that by releasing the influence of the arresting stop 25, intervening portions of the curtain may be rapidly run down when it is desired to use an aperture at one end when that near the other end has been previously in use. For instance, if the operator has been working with the lower aperture 7 on very fast work, and his next subject calls for a time exposure of considerable duration, he does not need to pump the escapement back and forth to bring the maximum aperture 10 at the upper end down to position but can do it with a single actuation after first rotating the operating knob 24.

I claim as my invention:

1. In a shutter, the combination with a feed roll, a curtain wound thereon and a tension roll having a normal tendency to take up the curtain, of controlling mechanism for one of said rolls comprising a revoluble member movable therewith and having an abutment, an escapement device cooperating with the revoluble member and comprising a winding stop and an arresting stop for the abutment and means for operating the arresting stop to an inoperative position independently of the winding stop.

2. In a shutter, the combination with a feed roll, a curtain wound thereon and a tension roll having a normal tendency to take up the curtain, of a controlling mechanism for one of said rolls comprising a revoluble member movable therewith and having an abutment, an escapement cooperating with the revoluble member and comprising a winding stop and an arresting stop for the abutment movable jointly one into and the other out of the path of the abutment and means for actuating the arresting stop into an inoperative position independently of the winding stop.

3. In a shutter, the combination with a feed roll, a curtain wound thereon and a tension roll having a normal tendency to take up the curtain, of a controlling mechanism for one of said rolls comprising a revoluble member movable therewith and having an abutment and a reciprocatory escapement coöperating with the revoluble member and embodying a winding stop and an arresting stop for the abutment movable jointly, one into and the other out of the path of the abutment, said arresting stop being rotatable on the escapement to an inoperative position independently of the winding stop.

4. In a shutter, the combination with a feed roll, a curtain wound thereon and a tension roll having a normal tendency to take up the curtain, of a controlling mechanism for one of said rolls comprising a revoluble member movable therewith and having an abutment, an escapement coöperating with the revoluble member and comprising a winding stop and an arresting stop for the abutment movable jointly, when the escapement is actuated, one into and the other out of the path of the abutment and means operable in one direction to actuate the escapement and in another direction to actuate the arresting stop to an inoperative position.

5. In a shutter, the combination with a feed roll, a curtain wound thereon and a tension roll having a normal tendency to take up the curtain, of a controlling mechanism for one of said rolls comprising a revoluble member movable therewith and having an abutment, a reciprocatory escapement coöperating with the revoluble member and comprising a winding stop and a pivoted arresting stop for the abutment movable jointly, when the escapement is reciprocated, one into and the other out of the path of the abutment, and an operating member for reciprocating the escapement, said member also being rotatable to actuate the arresting stop on its pivot to an inoperative position.

6. In a shutter, the combination with a feed roll, a flexible continuous curtain having a plurality of successive exposure openings therein, wound on the roll and a tension roll having a normal tendency to take up the curtain, of controlling mechanism for the feed roll comprising a revoluble member movable therewith and having an abutment, an escapement device coöperating with the revoluble member and comprising a winding stop and an arresting stop for the abutment movable jointly one into and the other out of the path of the abutment to normally allow but one aperture of the curtain to cross the focal plane as a result of the actuation of the escapement and means for actuating the arresting stop to an inoperative position independently of the winding stop to permit an unrestricted movement of the curtain when the winding stop is released through the actuation of the escapement.

WILLIAM F. FOLMER.

Witnesses:
RUSSELL B. GRIFFITH,
H. E. STONEBRAKER.